United States Patent [19]

Sakita et al.

[11] Patent Number: 5,194,491

[45] Date of Patent: Mar. 16, 1993

[54] PROCESS FOR PRODUCING RUBBER-MODIFIED STYRENE RESIN, AND RESIN COMPOSITION

[75] Inventors: Takaaki Sakita; Minoru Uchida; Tetsuo Hayase; Hiromitsu Hatakeyama, all of Yokkaichi, Japan

[73] Assignee: Mitsubishi Monsanto Chemical Company, Tokyo, Japan

[21] Appl. No.: 527,947

[22] Filed: May 24, 1990

[30] Foreign Application Priority Data

May 30, 1989 [JP] Japan .................................. 1-134756
May 30, 1989 [JP] Japan .................................. 1-134757

[51] Int. Cl.$^5$ ............................ C08L 51/04; B01J 8/10
[52] U.S. Cl. ........................................ 525/53; 525/52; 525/70; 525/263; 525/285; 525/302; 525/309; 525/314; 525/316; 422/188; 422/189
[58] Field of Search ...................... 525/53, 70, 52, 316

[56] References Cited

U.S. PATENT DOCUMENTS

| | | | |
|---|---|---|---|
| 3,676,527 | 7/1972 | Babcock, Jr. et al. | 525/53 |
| 3,981,944 | 9/1976 | Okamoto et al. | 525/53 |
| 4,311,803 | 1/1982 | Smith et al. | 525/53 |
| 4,777,210 | 10/1988 | Sosa et al. | 525/53 |
| 4,839,418 | 6/1989 | Schwaben et al. | 525/53 |

FOREIGN PATENT DOCUMENTS

| | | | |
|---|---|---|---|
| 0751977 | 1/1967 | Canada | 525/70 |
| 0301780 | 2/1989 | European Pat. Off. | 525/70 |

*Primary Examiner*—Ana L. Carrillo
*Assistant Examiner*—Vasu S. Jagannathan
*Attorney, Agent, or Firm*—Oblon, Spivak, McClelland, Maier & Neustadt

[57] ABSTRACT

The invention relates to an improved process for producing a rubber-modified styrene resin, and a rubber-modified styrene resin composition resulting therefrom, such resin having improved mechanical strength, impact resistance and high gloss, such being accomplished by producing a rubber-modified styrene resin containing substantially no rubber particle having a density of not higher than 0.96 gm/cm$^3$ at 25° C.

7 Claims, No Drawings

PROCESS FOR PRODUCING RUBBER-MODIFIED STYRENE RESIN, AND RESIN COMPOSITION

The present invention relates to an improved process for producing a rubber-modified styrene resin, and a rubber-modified styrene resin composition. Particularly, it relates to a process for continuously producing a rubber-modified styrene resin having improved mechanical strength such as impact resistance and improved appearance such as gloss, and a resin composition thereby produced.

To produce a rubber-modified styrene resin having excellent impact resistance and improved appearance, it is necessary to adjust the particle size of rubber particles dispersed in the resin to a proper level and adjust the particle size distribution within a proper range, and at the same time it is necessary that the rubber particles contain a proper amount of polystyrene.

The polystyrene contained in the rubber particles, includes a graft polystyrene which is chemically bonded to the rubber and an occluded polystyrene which is not chemically bonded to the rubber but can not be separated from the rubber particles by a usual dissolution-reprecipitation method. The graft polystyrene serves as an emulsifier whereby the rubber particles are dispersed in the polystyrene matrix under a stabilized condition. The occluded polystyrene also plays an important role to increase the volume fraction of the rubber particles and prevent an excessive deformation of the rubber phase.

As a method for producing such a rubber-modified styrene resin, widely practiced is a bulk-suspension two step polymerization method which is conducted in a batch system. This batch system polymerization is conducted in a plug-flow fashion. Therefore, if the mixing at the first bulk polymerization step is conducted properly, it is possible to bring the size of the individual rubber particles to a certain desirable level. Further, in the subsequent suspension polymerization, the reaction is conducted to such an extent that the conversion by polymerization will be almost 100%, whereby there will be many opportunities for the rubber and the styrene monomer to react each other, and it is possible to let individual rubber particles contain substantially the same amount of the polystyrene.

However, this batch system has inherent drawbacks such that (a) a large amount of an aid such as a suspension stabilizer is required, (b) it involves a number of operations which are hardly automated and thus require manual operations, (c) even after cooling and separating the resin beads from water and drying them, pelletizing is required to obtain a resin product, and thus a large quantity of energy is required, (d) it is necessary to treat a waste water containing chemical substances such as the aid, and (e) an aid such as a suspension stabilizer will remain in the resin product and is likely to lead to a defective appearance such as silver streaks. Thus, it has a number of problems to be solved for industrial application.

On the other hand, various continuous processes have been proposed. As one of them, a process is known in which an apparatus having a plurality (usually three or four) of agitation vessel-type reactors connected in series, is employed. However, in this process, the residence time distribution tends to be relatively wide, and there will be substantial differences in the reaction time of individual rubber particles with styrene, whereby a proper amount of polystyrene will not be contained in the rubber particles with a short residence time. Further, a fairly strong agitation is required to control the reaction in each reactor, but because of the limitation due to the high viscosity of the substance to be treated, there is a problem that the conversion by polymerization can not be sufficiently high even in the final reactor. Therefore, it is very difficult to obtain by such a continuous process a product with a quality equal to the one obtained by the batch system. Namely, for the above-mentioned reasons, there still remain such problems that it is difficult to obtain a product having high impact strength because the product contains rubber particles which do not contain sufficient amounts of polystyrene, and that the product will be inferior in the appearance such as the gloss.

To solve the above problems, it is conceivable to combine a plug-flow type reactor useful for continuous polymerization and to maintain the reaction to a high level of conversion by polymerization. However, the following problems will be involved therein as technical difficulties.

(1) Before the rubber is dispersed in a particulate form, the product shows rubbery viscosity, since the rubber phase is a continuous phase, and the polymer is likely to adhere to e.g. the wall of the apparatus at the dead space portion where shearing by agitation will not be adequate, whereby a constant operation will be hindered. The polymerization reaction under such a rubbery viscosity can be conducted by a reactor of perfect mixing type. However, it is very difficult to conduct by a plug-flow type reactor a reaction which requires uniform shearing throughout the reactor.

(2) It is desired to have a high conversion at the final stage. However, this involves not only a difficulty in handling the highly viscous substance but also a difficulty such that if the conversion increases, the reaction rate tends to decrease with a decrease of unreacted monomers, whereby a long residence time with a reactor having a large capacity will be required. Thus, an attempt to conduct a batch system reaction in a continuous manner is likely to bring about not only a problem in the quality of the resulting resin composition but also a disadvantage that the construction cost of the apparatus will be high.

It is a first object of the present invention to solve the above problems and to provide a process for continuously producing a resin having such an excellent quality as of a rubber-modified styrene resin prepared by a batch system. According to the present invention, this object can be accomplished by a process for continuously producing a rubber-modified styrene resin, which comprises continuously supplying a feed solution composed mainly of a styrene monomer and a rubbery polymer to a first reactor of perfect mixing type and subjecting it to a polymerization reaction, while continuously supplying a feed composed mainly of a styrene monomer to a second reactor of the type useful for a polymerization reaction and subjecting it to a polymerization reaction, introducing the products continuously withdrawn from the first and second reactors, respectively, into a mixer and mixing them, introducing the product continuously withdrawn from the mixer, into a plug-flow type reactor to increase the conversion by polymerization, and then devolatilizing unreacted monomers from the reaction product, wherein the rubbery polymer in the product withdrawn from the mixer is already in a particulate form, but up to the exit of the mixer, the polymerization proceeds only to such an extent that the conversion by polymerization of monomers to polymer does not exceed 30% as measured at the exit of the mixer, said plug-flow type reactor consists of a single reactor or a plurality of reactors connected in series and has a plug-flow characteristic corresponding to at least 15 vessels in a model series of vessels of perfect mixing type, and in this plug-flow type reactor, the polymerization proceeds to a conversion to polymer within a range of from 85 to 95%.

Another object of the present invention is to provide a rubber-modified styrene resin having an excellent quality equal to or superior to the one produced by a batch system. According to the present invention, this object is accomplished by producing rubber-modified styrene resin containing substantially no rubber particle having a density of not higher than 0.96 at 25° C., obtained by the above process.

Now, the present invention will be described in detail with reference to the preferred embodiments.

In the present invention, as the styrene monomer constituting the feed solution to be supplied to each of the first and second reactors, any styrene monomers known to be useful for the production of rubber-modified styrene resins including, for example, styrene, an alkyl-substituted styrene such as α-methylstyrene or p-methylstyrene, and a halogen-substituted styrene such chlorostyrene, may be used alone or in combination as a mixture of two or more different types. Particularly preferred among them is styrene.

Further, this styrene monomer may partially be substituted by other monomer copolymerizable therewith, such as acrylonitrile, maleic anhydride, methyl methacrylate, vinyl acetate or divinylbenzene.

As the rubbery polymer in the feed solution to be supplied to the first reactor, natural rubber, styrenebutadiene rubber, polybutadiene, polyisoprene, nitrile rubber or an elastomeric block copolymer of 1,3-conjugated diene with a styrene monomer, may for example be mentioned. Preferred is polybutadiene, styrenebutadiene rubber or polyisoprene.

The feed solution composed mainly of such a styrene monomer and a rubbery polymer usually comprises from 80 to 97% by weight of the styrene monomer and from 3 to 20% by weight of the rubbery polymer, preferably from 82 to 95% by weight of the styrene monomer and from 5 to 18% by weight of the rubbery polymer. If necessary, a solvent composed of one or more aromatic hydrocarbons such as toluene, xylene and ethylbenzene, may be used, for example, within a range of up to 20% by weight. If the amount of this solvent exceeds 20% by weight, the polymerization rate substantially decreases, such being not economical. Further, this feed solution may contain a small amount of a polymerization initiator such as tert-butyl peroxy benzoate, tert-butyl peroxy acetate, 1,1-ditert butyl peroxy cyclohexane, a peroxide such as benzoyl peroxide or lauroyl peroxide, or azobisisobutyronitrile, whereby the impact strength can be improved.

In the present invention, the feed solution composed mainly of the above styrene monomer and the rubbery polymer, is polymerized in the first reactor of perfect mixing type. Such a reactor of perfect mixing type may be any reactor so long as the above feed solution can be maintained in a substantially uniform mixed state in the reactor. Preferred stirring vanes include helical ribbon-type, double helical ribbon-type and anchor-type vanes. In the case of the helical ribbon-type vanes, it is possible to further improve the up-and-down circulation in the reactor by attaching a draft tube.

In general, when a uniform feed solution comprising the styrene monomer and the rubbery polymer, is polymerized, at the initial stage of the polymerization, the solution containing the styrene monomer and its polymer (resin phase) is separated from the solution containing the rubbery polymer and the styrene monomer (rubber phase) so that the rubber phase constitutes a continuous phase and the resin phase constitutes a dispersed phase. When the polymerization further proceeds, at a certain point, i.e. at a point where the resin phase can no long remain as the dispersed phase as a result of an increase of the amount of the styrene polymer, so-called phase inversion takes place, whereby the resin phase turns into a continuous phase and the rubber phase turns to be a dispersed phase. The first reactor can be operated in either state. However, it is preferred that the polymerization is conducted in a state where the rubber phase is dispersed in a particulate form. The residence time in the first reactor is preferably within a range of from 1 to 6 hours.

On the other hand, to the second reactor disposed in parallel with the first reactor, the styrene monomer is continuously supplied and polymerized. There is no particular restriction as to the type of the second reactor. It may be any reactor for polymerization reaction which is free from a dead space and which is equipped with a temperature controlling means. A perfect mixing reactor of the same type as the first reactor may be employed. However, a plug-flow type reactor such as a tubular reactor may also be employed.

The reaction products continuously withdrawn from the first and second reactors, respectively, are then introduced into a mixer and thoroughly mixed therein. The mixer is preferably an in-line mixer equipped with a stirrer, or a third reactor of perfect mixing type having a residence time shorter than that of the first reactor.

The in-line mixer is of the type wherein the function of mixing and stirring is predominant over the polymerization reaction, whereby efficient mixing and stirring can be accomplished in a short period of residence time. Usually, the residence time of not longer then 20 minutes is sufficient, and in this sense, the in-line mixer is distinguished from a reactor. The in-line mixer may be provided with two inlets so that the respective flows from the first and second reactors may directly be introduced thereinto. Otherwise, the two flows may be joined in a pipe line so that they may be introduced through a single inlet into the in-line mixer. There is no particular restriction as to the type of the in-line mixer, so long as it is capable of conducting the mixing continuously and capable of mixing the two liquids substantially uniformly in a short period of time. However, it is preferably of the type wherein the agitation shear rate can easily be changed during the mixing, as the case requires. Specific examples include Homomic Lineflow Mixer manufactured by Tokushu Kikai Kogyo K.K., Satake Multi-line Mixer manufactured by Satake Kagaku K.K. and Onlator manufactured by Kabushiki Kaisha Sakura Seisakusho.

At the exit of the in-line mixer, the product must be in such a state that the rubber phase constitutes a dispersed phase, i.e. the rubbery polymer is already in a particulate form. The timing for the phase inversion when the rubbery polymer turns into particles, depends on the volume ratio of the resin phase to the rubber phase and thus relates to the feed composition. However, in a case where the first reactor is operated under such a conversion that the rubbery polymer is already in a particulate form at the exit of the first reactor, the conversion by polymerization in the second reactor may simply be maintained at a level not to invert such a state. Whereas, in a case where the first reactor is operated under a polymerization condition with a conversion lower than the level where the reaction product undergoes phase inversion, the conversion by polymerization in the second reactor is required to be maintained at a sufficiently high level so that when the respective flows from the two reactors are joined, the conversion will be at a level where the rubbery polymer is turned into a particulate form. However, in order to obtain a quality superior to the one obtainable by a batch system polymerization reaction, it is preferred that the rubbery polymer is already in a particulate form at the exit of the first reactor. Further, the conversion in the product at the exit of the in-line mixer must be maintained at a level of not higher than 30%.

Now, another preferred embodiment of the present invention in which the third reactor is used as the mixer will be described. The third reactor is small in size and otherwise may functionally be the same as the above-mentioned first and second reactors. The stirring vanes provided to this reactor preferably have a shape of a helical ribbon, double helical ribbon or an anchor. In the case of the helical ribbon type vane, a draft tube may be attached to further improve the up-and-down circulation in the reactor.

At the exit of the third reactor, the rubber phase is in such a state that it constitutes a dispersed phase i.e. the rubbery polymer is already in the particulate form.

The residence time in the third reactor in the present invention is the time of a value obtained by dividing the volume of the polymerization solution in the third reactor by the amount of the flows per unit hour continuously withdrawn from the first and second reactors, joined, and introduced to the third reactor. Such a residence time in the third reactor is adjusted to be shorter than the residence time of the reaction solution in the first reactor. Specifically, it is preferably within a range of from 0.34 to 0.7 hour. If the residence time is outside this range, the mixing tends to be inadequate, or the viscosity tends to be too high, whereby stirring and heat removal tend to be inadequate, and it becomes difficult to stabilize the rubber particles. In the third reactor, the residence time is short, and the conversion will not be increased so sharply. Besides, the rubber polymer is already in a particulate form. Therefore, it is preferred that when the flows from the first and second reactors are joined, the rubbery polymer is beyond the point for the phase inversion for forming particles. Even when it is not beyond such a phase inversion point, it must be close to such a point. Namely, when the first reactor is operated under a polymerization condition with a conversion such that the rubbery polymer is already in a particulate form at the exit of the first reactor, the polymerization in the second reactor may be conducted at a conversion sufficient to maintain this state. Whereas, in a case where the first reactor is operated at a conversion lower than the level for phase inversion, the conversion in the second reactor must be kept at a sufficiently high level so that when the two flows are joined, the conversion will be at a level beyond the conversion for the phase inversion. The timing for the phase inversion when the rubbery polymer is formed into particles, depends on the volume ratio of the resin phase to the rubber phase and thus relates to the compositions of the polymerization solutions from the first and second reactors. In this case, in order to obtain a quality higher than the one obtainable by the batch system, the conversion in the second reactor is preferably not to exceed the conversion in the first reactor.

There is no particular critical point as to the ratio of the products introduced from the first and second reactors to the mixer. However, if the flow from the second reactor is too large, it becomes necessary to increase the rubber concentration in the feed solution to be supplied to the first reactor. Therefore, the ratio of the flows from the two reactors is preferably within a range of from 3:1 to 1:3.

From the mixer, the product in an amount corresponding to the total amount of the products introduced from the first and second reactors, is continuously withdrawn and introduced into a plug-flow type reactor, wherein the conversion will be increased. This plug-flow type reactor may be the one wherein agitation chambers and multitubular shell-and-tube type heat exchangers are alternately arranged, or the one wherein a longitudinally elongated container is provided with a cooling pipe and a stirrer. However, it may be without a stirrer, so long as it is designed to be free from a so-called dead space. In order to have a plug-flow characteristic corresponding to at least 15 vessels in a model series of vessels of perfect mixing type, this plug-flow type reactor usually takes a structure in which a plurality of reactors are connected in series. However, it is not economical or desirable to increase the number of reactors connected in this way. Usually, it is preferred to have two reactors connected in series. (For the model series of vessels of perfect mixing type, reference is made to 1) Kagaku Kogaku Binran (Chemical Engineering Handbook), Fourth Edition, compiled by the Society of Chemical Engineers, and published by Maruzen Co., Ltd., P. 1460–1465; 2) Mason, D. and E. L. Piret: Ind. Eng. Chem., 42, 817 (1950); and 3) Kramers, H. and G. Alberba: Chem. Eng. Sci., 2, 173 (1953). In the plug-flow type reactor, the polymerization reaction is conducted to a conversion within a range of from 85 to 95% at the exit of the reactor.

According to the process of the present invention, it is possible to obtain a resin composition having a quality equal to or superior to a product obtained by the batch system polymerization reaction method. This is accomplished for the first time by satisfying all the requirements constituting the present invention. Now, the significance of these requirements will be explained.

(1) According to the process of the present invention, polymerization is conducted in easily operable reactors of perfect mixing type until the rubber phase is formed into particles during the process for the production of the rubber-modified styrene resin, and two different types of polymerization solutions from the first and the second reactors are thoroughly mixed in the mixer such as the in-line mixer or the third-reactor of perfect mixing type having a short residence time, whereby uniform rubber particles will finally be formed under a stabilized condition. However, if the second reactor is omitted i.e. with only one reactor, the desired effects of the present invention can not be obtained. Likewise, the effects of the present invention can not be accomplished without the mixer i.e. the in-line mixer or the third reactor of perfect mixing type having a short residence time. If the rubber is formed into particles in the first reactor, and the product is introduced directly to the plug-flow type reactor without passing through the mixer, the final product will contain rubber particles having a density of not higher than 0.96 at 25°. This fact indicates that in the process wherein the second reactor or the mixer is omitted, part of rubber particles will be such that no adequate occlusion has been accomplished. Further, in such a case, it is observed that the particle size distribution of the rubber particles tends to be wide. This is believed to be a factor which makes it difficult to obtain a resin having a good quality.

These difficulties can not be solved even when the mixer such as the in-line mixer or the third reactor is included, if the second reactor is omitted i.e. if only one reactor of perfect mixing type is employed, or even when the first and second reactors are provided in parallel, if the mixer such as the in-line mixer or the third reactor is omitted. Although the reason is not clearly understood, according to the process of the present invention, substantially no rubber particles having a density of not higher than 0.96 will be detected in the final resin product, and the particle size distribution of the rubber particles will be substantially narrow. From this fact, it is believed that the two liquids having substantially different properties withdrawn from the first and second reactors are subjected to effective agitation and mixing, and even if rubber particles have already been formed, fusion and separation of rubber particles repeatedly occur, whereby occlusion and unification of the particle size take place.

Further, if the two liquids are introduced into the plug-flow type reactor without the mixer such as the in-line mixer or the third reactor, adhesion of a polymer gel in the reactor occurs, and it becomes difficult to control the polymerization reaction.

(2) Once the rubber is formed into particles, the polymerization operation can relatively easily be conducted by the plug-flow type reactor. In the plug-flow type reactor, the conversion is increased from at most 30% to at least 85%, whereby the grafting of the styrene to the rubber particles and occlusion will be further progressed. If the plug-flow characteristic is lower than the level corresponding to at least 15 vessels in a model series of vessels of perfect mixing type, the heat removal and stirring will be difficult with the reactor wherein the conversion is at most 30% at the inlet and at least 85% at the exit. Further, it will be difficult to control the polymerization reaction, whereby the control of the molecular weight will be inadequate, and the grafting of styrene and occlusion can not be uniformly conducted, the density of the some of the rubbery polymer in the resin composition will be not higher than 0.96 (25° C.), and the quality of the product resin composition will be impaired.

The upper limit of at least 15 vessels in the model series of vessels of perfect mixing type in the plug-flow type reactor, is not particularly critical, but it is meaningless to increase the upper limit needlessly, and the upper limit is usually about 40.

To control the conversion of the product introduced from the mixer to the plug-flow type reactor to a level of at most 30%, has a significance in that the polymerization reaction under the condition of the plug-flow type reactor be maintained as long as possible. Further, if the conversion of the product in the mixer exceeds 30%, the particle size distribution of rubber particles tends to be wide, such being undesirable. It is conceivable that the fusion and separation of the particles may be hindered by the influence of the high viscosity.

If the conversion of the styrene in the product at the exit of the plug-flow type reactor is at least 85%, grafting of styrene and occlusion can be adequately and uniformly be formed substantially for all rubber particles, whereby substantially no rubber particles having a density of not higher than 0.96 at 25° C. will be formed. On the other hand, to bring the conversion for styrene polymerization of the product at the exit of the plug-flow type reactor to a level exceeding 95%, it takes a long time for the polymerization reaction, and the reactor is required to be of a large size without any effects for improvement of the quality of the product resin composition, such being undesirable.

METHOD FOR MEASURING THE DENSITY OF THE RUBBERY POLYMER IN A PARTICULATE FORM

Into each of six 50 ml Erlenmeyer flasks, 1 g of a sample of a rubber-modified styrene resin composition is charged. On the other hand, reagents of dimethylformamide (hereinafter referred to simply as DMF) and N-methyl-2-pyrrolidone (hereinafter referred to simply as NMP) are prepared. A reagent of DMF alone is designated as liquid A, and a reagent of NMP alone is designated as liquid F. Mixtures of the two reagents at the following proportions (weight ratio) are designated as liquids B, C, D and E.

|  | Liquid's name | | | | | |
| --- | --- | --- | --- | --- | --- | --- |
|  | Liquid A | Liquid B | Liquid C | Liquid D | Liquid E | Liquid F |
| Composition | DMF | 80/20 | 60/40 | 40/60 | 20/80 | NMP |
| Density | 0.95 | 0.966 | 0.982 | 0.998 | 1.014 | 1.03 |

With respect to the numerical values in the compositions in the above Table, the numerator indicates DMF and the denominator indicates NMP. The density is the one measured at 25°.

Into the above six flasks each containing the above identified sample, liquids A to F are introduced, respectively, each in an amount of 15 ml, and the sample was dissolved and dispersed. The rubbery polymer particles in the sample resin do not dissolve in the solvent. When the polystyrene of the matrix portion is completely dissolved, each dispersion is transferred to a cell for centrifugal separation. The sample-containing substance remaining as deposited in the Erlenmeyer flask is washed by using 15 ml of the liquid having the same composition as used for the dissolution, as a washing liquid and transferred together with the washing liquid to the cell for centrifugal separation. Then, the cell is mounted on a centrifugal separator and subjected to centrifugal separation treatment at a temperature of 25° C. at 20,000 rpm for 4 hours. As the centrifugal separator, CR-26H manufactured by Hitachi Koki K.K. is used.

In each cell, rubbery polymer particles lighter than the solvent used, will float on the liquid surface, and rubbery polymer particles heavier than the solvent will precipitate at the bottom of the cell. From this cell, the portion containing the floating rubbery polymer and the portion containing the precipitated rubbery polymer are separated, respectively, as test samples. These test samples are transferred to separate Erlenmeyer flasks. To remove the solvents of liquids A to F, the polystyrene mixture is precipitated by a reprecipitation method in methanol, collected by filtration and dried.

The respective dried samples (mixtures comprising the rubbery polymer and the polystyrene) are again transferred to Erlenmeyer flasks, respectively, and the polystyrene is dissolved and dispersed in 15 ml of a solvent mixture of methyl ethyl ketone/acetone (volume ratio: 50/50). Each dispersion is transferred to a cell and subjected to centrifugal separation (at 20,000 rpm for 5 hours). The centrifugally separated precipitates are the particulate rubbery polymer. The supernatant is poured into methanol, and the formed precipitates are collected by filtration and dried, and the product thereby obtained is the polystyrene of the matrix portion having the rubbery polymer removed therefrom. From the results of the above fractional weighing, a density distribution curve of the particulate rubbery polymer can be drawn. Substantially no particulate rubbery polymer having a density of not higher than 0.96, means that there is substantially no floating gel as the results of the fractional operation by centrifugal separation not only with liquid A but also with liquid B, and in the subsequent centrifugal separation with the solvent mixture of methyl ethyl ketone/acetone, the test sample obtained from the supernatant using liquid A and liquid B as the solvent, contains no rubbery polymer in an amount detectable by the above analysis.

Now, the present invention will be described in further detail with reference to Examples and Comparative Examples. However, it should be understood that the present invention is by no means restricted by such specific Examples. In the following Examples and Comparative Examples, "parts" means "parts by weight" unless otherwise specified.

EXAMPLE 1

Ten parts of polybutadiene rubber (As'.prene 755A, tradename, manufactured by Asahi Chemical Industry Co., Ltd.) was dissolved in 82.5 parts of styrene and 7.5 parts of ethylbenzene. To this solution, 0.0615 part (per 100 parts of the total amount of the above polybutadiene, styrene and ethylbenzene) of tert-butyl peroxybenzoate was added and mixed as a polymerization initiator. This feed solution was continuously supplied at a rate of 8 l/hr to a first reactor (internal capacity: 25 l) of perfect mixing type having a draft tube and internally equipped with a double helical vane stirrer. The temperature in this reactor was 102° C., and the rotational speed of the stirring vane was 80 rpm. The conversion by polymerization in the product at the exit of this reactor was 23%, and the rubbery polymer was in a particulate form, as observed by a phase contrast microscope.

On the other hand, styrene was continuously supplied at a rate of 4 l/hr to a second reactor which is of the same type as the first reactor but has an internal capacity of 15 l. The temperature in the second reactor was 115° C., and the rotational speed of the stirring vane was 80 rpm. The conversion by polymerization in the product at the exit of the second reactor was 20%.

The respective polymerization solutions withdrawn from the exits of the above first and second reactors, were joined in a pipe and immediately introduced into an in-line mixer (Onlator, manufactured by Sakura Seisakusho). This in-line mixer had an internal capacity of 2 l, and a number of semi-oval kneader pins are projected from the inner wall of the cylindrical main body. On the other hand, from the rotational shaft, a number of similar kneader pins are projected to intermesh with the above kneader pins. The shaft is driven at a rotational speed of 200 rpm.

The rubbery polymer was already in a particulate form in the first reactor, but it was observed that by passing through the in-line mixer, the rubber particles became uniform, and the particle size distribution became narrow.

In this in-line mixer, a heating medium of 110° C. was circulated in its jacket, and the conversion by polymerization in the product at the exit of the in-line mixer was 24%.

The polymerization solution withdrawn from this in-line mixer was introduced into a plug-flow type reactor of two stages (two reactors) connected in series, and the polymerization was further continued.

This plug-flow type reactor has a structure in which eight cylindrical agitation chambers having a small height relative to the diameter (stirring vanes include a large flat plate vane sweeping the majority of the agitation chamber and with a clearance from the inner wall of the agitation chamber being constant at any portion, and small inclined paddle vanes divided into three in the axial direction and disposed at an angle of every 90°) are partitioned by seven shell-and-tube type heat exchangers connecting the respective agitation chambers. Further, this tower type reactor was tested by means of a tracer to find out its corresponding number of vessels in a model series of vessels of perfect mixing type in accordance with a δ-response method, whereby it was found to be substantially the same as the one calculated as a plug-flow type reactor having 11 vessels as the corresponding number of vessels at a flow rate of 12 l/hr. This corresponding number of vessels did not substantially change even if the flow rate was changed. The plug-flow type reactor in this Example was composed of two stages (two reactors). Therefore, its corresponding number of vessels in the model series of vessels of perfect mixing type is 22.

The reaction temperature at the first stage of the two stage plug-flow type reactor was 121° C. at the inlet and 127° C. at the exit, and the rotational speed of the stirring vane was 10 rpm. The conversion by polymerization was 70% at the exit.

In the reactor of the second stage, the reaction temperature was 130° C. at the inlet and 162° C. at the exit, and the rotational speed of the stirring vane was 5 rpm. The conversion by polymerization was 90% at the exit. At the inlet of the second stage reactor, a lubricant and a stabilizer such as 1.0 part of mineral oil and 0.05 part of triethylene glycol-bis[3-(3-t-butyl-5-methyl-4-hydroxyphenyl)propionate] per 100 parts by weight of the reaction mixture introduced thereinto, were added together with a small amount of styrene.

The polymerization solution withdrawn from the outlet for the reaction mixture of the second stage plug-flow type reactor, was passed through an adjusting valve, heated by a plurality of tubes and then vacuumed under a reduced pressure of 15 mmHg and flashed in a devolatillization chamber heated to 230° C., whereby unreacted styrene was removed, and at the same time, low boiling point substances such as ethylbenzene as the solvent were also removed. The polymer having the low boiling point substances removed, was transferred by a screw from the bottom of the devolatillization chamber to an extruder and withdrawn from the die as a strand, which was then cut to obtain resin pellets. The resin pellets had volatile components removed to such an extent that only about 500 ppm of styrene and ethylbenzene remained.

With respect to the rubber-modified styrene resin thus obtained, its properties and performance were evaluated as follows.

(1) With respect to the rubber particles dispersed in the resin, their electron microscopic photograph was taken by a super thin cut piece method, and the shape of the rubber particles in the photograph was inspected. Further, the weight average particle size and the number average particle size were measured by a light sedimentation method by means of Model 3000 particle analyzer manufactured by Martin Sweet Company (Luisville, State of Kentucky, U.S.A.) and calculated by the following equations:

Weight average particle size $(D_w) = \Sigma niDi^4/\Sigma niDi^3$

Number average particle size $(D_N) = \Sigma niDi/\Sigma ni$

In the above formulas, Di is the representative value of the i-th class when the particle sizes were classified by the above measuring apparatus, and ni is the number of rubbery polymer particles belonging to the i-th class.

The rubber particle size distribution is represented by the formula $(D_W/D_N)$ (2) The density of the rubbery polymer (as mentioned in the foregoing)

(3) The gloss (%)

A test specimen was prepared by injection molding at a cylinder temperature of 200°. The gloss was measured in accordance with JIS Z8741 (incident angle: 60°) at the center portion of the test specimen (75 mm × 160 mm × 2.6 mm).

(4) Falling weight impact strength (kg·cm):

The falling weight impact strength was measured by a DuPont type falling weight impact tester using the same injection molded test specimen as used for the measurement of the gloss.

(5) Izod impact strength (kg·cm/cm):

The izod impact strength was measured in accordance with JIS K7110 (notched).

COMPARATIVE EXAMPLE 1

6.5 Parts of polybutadiene rubber (Asaprene 755A, manufactured by Asahi Chemical Co., Ltd.) was dissolved in 86 parts of styrene and 7.5 parts of ethylbenzene, and 0.0615 part (per 100 parts of the total amount of the polybutadiene, styrene and ethylbenzene) of tert-butyl peroxybenzoate was mixed thereto as a polymerization initiator. This feed solution was supplied at a rate of 12 l/hr to a reactor having a draft tube and internally equipped with a double helical vane stirrer, having an internal capacity of 40 l. The temperature was 102° C., and the rotational speed of the stirring vane was 100 rpm. The conversion by polymerization was 24%, and the rubber was in a particulate form. The polymerization solution withdrawn from the reactor was introduced directly to the two stage plug-flow type reactor without passing it through the in-line mixer or any other reactor. The subsequent operation was conducted under the same conditions as in Example 1 to obtain a resin product.

COMPARATIVE EXAMPLE 2

The operation was conducted under the same conditions as in Example 1 except that the rotational speed of the stirring vane of the first reactor having an internal capacity of 25 l in Example 1 was changed to 90 rpm, and the polymerization solutions withdrawn from the first and second reactors were joined in a pipe and introduced directly into the two stage plug-flow type reactor without passing it through the in-line mixer of any other reactor, to obtain a resin product.

COMPARATIVE EXAMPLE 3

Instead of the first and second reactors having internal capacities of 25 l and 15 l in Example 1, a reactor having an internal capacity of 15 l was used as the first reactor, and a solution obtained by dissolving polybutadiene rubber in styrene and ethylbenzene, was charged in the first reactor, while a reactor having an internal capacity of 25 l was used as the second reactor and styrene was charged thereto, and polymerization was conducted respectively in the first and second reactors. The temperatures were 102° C. and 115° C., respectively, and the rotational speed of the stirring vane was 80 rpm in both reactors. The conversion by polymerization was 14% and 33%, respectively. In the first reactor, the rubber was not in a particulate form.

The subsequent operation was conducted under the same conditions as in Example 1 to obtain a resin product.

COMPARATIVE EXAMPLE 4

Instead of the first reactor having an internal capacity of 25 l in Example 1, a reactor having a draft tube and internally equipped with a double helical vane stirrer, having an internal capacity of 40 l, was used as the first reactor. The temperature was 102° C., and the rotational speed of the stirring vane was 120 rpm. The conversion by polymerization was 37%, and the rubber was in a particulate form. Except for the above, the operation was conducted under the same conditions as in Example 1 to obtain a resin product, and the conversions by polymerization at the exits of the first and second stages of the plug-flow type reactor were 65% and 90%, respectively.

COMPARATIVE EXAMPLE 5

The same rubber solution as in Example 1 was supplied to the first reactor having an internal capacity of 15 l having a draft tube and internally equipped with a double helical vane at a rate of 4.8 l/hr. The temperature was 102° C., and the rotational speed of the stirring vane was 80 rpm. The conversion by polymerization was 23%, and the rubber was in a particulate form.

Separately, styrene was supplied to a second reactor having an internal capacity of 9 l and internally equipped with a double helical vane, at a rate of 2.4 l/hr. The temperature was 115° C., and the rotational speed of the stirring vane was 80 rpm.

The flows withdrawn from the above first and second reactors were joined and passed through an in-line mixer, and while discharging a part of the liquid out of the system by a pump, the liquid was introduced directly to the second stage plug-flow type reactor of Example 1 at a flow rate of 6 l/hr, without passing it through the first stage plug-flow type reactor. The temperature at the inlet was 120° C., and the temperature at the temperature at the exit was 164°. The conversion by polymerization at the exit was 90%. Except for the above, the operation was conducted in the same manner as in Example 1 to obtain a resin product.

COMPARATIVE EXAMPLE 6

The same rubber solution as in Example 1 was supplied to a first reactor having a draft tube and internally equipped with a double helical vane, having an internal capacity of 40 l, at a rate of 12.8 l/hr. The temperature was 102° C., and the rotational speed of the stirring vane was 80 rpm. The conversion by polymerization was 23%, and the rubber was in a particulate form.

Separately, styrene was supplied to a second reactor having a draft tube and internally equipped with a double helical vane, having an internal capacity of 25 l, at a rate of 6.4 l/hr. The temperature was 115° C., and the rotational speed of the stirring vane was 80 rpm. The flows withdrawn from the first and second reactors were joined and passed through an in-line mixer. Then, while discharging a part of the liquid out of the system by means of a pump, the liquid was introduced to the two stage plug-flow type reactor at a rate of 16 l/hr. The subsequent operation was conducted under the same conditions as in Example 1 to obtain a resin product. The conversions by polymerization in the products at the exits of the first and second stages, were 52% and 82%, respectively.

The polymerization conditions of the foregoing Examples and Comparative Examples are shown in Table 2, and the results of the evaluation of the resin products thereby obtained are shown in Table 2.

TABLE 1

| | Example 1 | Comparative Example 1 | Comparative Example 2 | Comparative Example 3 | Comparative Example 4 | Comparative Example 5 | Comparative Example 6 |
|---|---|---|---|---|---|---|---|
| First reactor of perfect mixing type | | | | | | | |
| Volume (l) | 25 | 40 | 25 | 15 | 40 | 15 | 40 |
| Flow rate (l/hr) | 8 | 12 | 8 | 8 | 8 | 4.8 | 12.8 |
| Residence time (hr) | 3.1 | 3.3 | 3.1 | 1.9 | 5.0 | 3.1 | 3.1 |
| Temp. (°C.) | 102 | 102 | 102 | 102 | 102 | 102 | 102 |
| Conversion (%) | 23 | 24 | 23 | 14 | 37 | 23 | 23 |
| Second reactor of perfect mixing type | | Nil | | | | | |
| Volume (l) | 15 | — | 15 | 25 | 15 | 9 | 25 |
| Flow rate (l/hr) | 4 | — | 4 | 4 | 4 | 2.4 | 6.4 |
| Residence time (hr) | 3.75 | — | 3.75 | 6.25 | 3.75 | 3.75 | 3.9 |
| Temp. (°C.) | 115 | — | 115 | 115 | 115 | 115 | 115 |
| Conversion (%) | 20 | — | 20 | 33 | 20 | 20 | 20 |
| In-line mixer | | Nil | Nil | | | | |
| Volume (l) | 2 | — | — | 2 | 2 | 2 | 2 |
| Flow rate (l/hr) | 12 | — | — | 12 | 12 | 7.2 | 19.2 |
| Residence time (hr) | 0.17 | — | — | 0.17 | 0.17 | 0.28 | 0.10 |
| Temp. (°C.) | 110 | — | — | 110 | 110 | 110 | 110 |
| Conversion (%) | 24 | — | — | 23 | 33 | 25 | 24 |
| First stage plug-flow type reactor | | | | | | Nil | |
| Volume (l) | 25 | 25 | 25 | 25 | 25 | — | 25 |
| Flow rate (l/hr) | 12 | 12 | 12 | 12 | 12 | — | 16 |
| Residence time (hr) | 2.1 | 2.1 | 2.1 | 2.1 | 2.1 | — | 1.6 |
| Exit temp. (°C.) | 127 | 127 | 127 | 127 | 127 | — | 127 |
| Conversion (%) | 60 | 60 | 60 | 60 | 65 | — | 52 |
| Second stage plug-flow type reactor | | | | | | | |
| Volume (l) | 25 | 25 | 25 | 25 | 25 | 25 | 25 |
| Flow rate (l/hr) | 12 | 12 | 12 | 12 | 12 | 6 | 16 |
| Residence time (hr) | 2.1 | 2.1 | 2.1 | 2.1 | 2.1 | 4.2 | 1.6 |
| Exit temp. (°C.) | 162 | 162 | 162 | 162 | 162 | 164 | 162 |
| Conversion (%) | 91 | 90 | 90 | 90 | 92 | 90 | 82 |
| Corresponding number of vessels of the plug-flow type reactor | 22 | 22 | 22 | 22 | 22 | 11 | 22 |

TABLE 2

| | Example 1 | Comparative Example 1 | Comparative Example 2 | Comparative Example 3 | Comparative Example 4 | Comparative Example 5 | Comparative Example 6 |
|---|---|---|---|---|---|---|---|
| Rubber particle shape | ○ | × | △ | ○ | △ | ○ | ○ |
| $D_W$ (μm) | 1.01 | 0.99 | 1.04 | 1.03 | 1.03 | 1.02 | 1.05 |
| $D_W/D_N$ | 1.9 | 3.2 | 2.7 | 1.8 | 2.4 | 2.0 | 1.9 |
| Rubber particles having a density of not higher than 0.96 | Absent | Present | Present | Absent | Present | Present | Present |
| Gloss (%) | 91 | 78 | 81 | 92 | 83 | 86 | 85 |
| Falling weight impact strength (kg · cm) | 78 | 18 | 16 | 23 | 40 | 35 | 22 |
| Izod impact strength (kg · cm/cm) | 11.3 | 10.6 | 11.1 | 10.8 | 9.8 | 10.3 | 11.4 |

In the column for "in-line mixer" in Table 1, the temperature is the jacket temperature. Further, in Table 1, the conversion means the conversion by polymerization.

In Table 2, the rubber particle shape is the one inspected by an electron microscopic photograph, and ○ indicates that the particles are substantially spherical, x indicates that the particle surface is roughened, and Δ indicates an intermediate state between ○ and x. $D_W$ means the weight average particle size (μm), and $D_W/D_N$ indicates the particle size distribution of the rubber particles. The same applies in the subsequent Tables 3 to 8.

EXAMPLE 2

A rubber-modified styrene resin was produced under the same condition as in Example 1 except for the following points. Namely, the temperature of the first reactor was changed to 100° C. The conversion by polymerization in the product withdrawn from the first reactor was 20%, and the rubbery polymer was in a particulate form. The temperature in the second reactor was 117° C., and the conversion by polymerization here was 23%. The polymerization solutions withdrawn from the first and second reactors were joined and introduced to the same in-line mixer as in Example 1 and stirred and mixed, but the rotational speed here was 300 rpm.

EXAMPLE 3

Instead of the in-line mixer used in Example 1, the in-line mixer of the following type (Homomic Line-flow Mixer, manufactured by Tokushu Kika Kogyo K.K.) was employed. Namely, it was a container having an internal capacity of 1.1 l and has a liquid inlet at the lower portion and a liquid exit at the side portion. However, the container had a structure that the liquid withdrawn from the liquid exit was led in such a manner that the liquid overflowed from the space between the top of the container and the cover was guided in a ring-shaped groove defined by the outer wall. This in-line mixer had an inclined turbine vane in a stater immediately above the lower inlet of the container, and by the rotation of this vane, the liquid was raised along the center shaft and permitted to flow down along the wall of the container to form a circulation flow. This in-line mixer was operated at a rotational speed of the turbine of 2000 rpm. Except for the above, the operation was conducted under the same conditions as in Example 1.

The operational conditions in Examples 2 and 3 are shown in Table 3, and the results of the evaluation of the resin products thereby obtained are shown in Table 4.

TABLE 3

|  | Example 2 | Example 3 |
|---|---|---|
| First reactor of perfect mixing type |  |  |
| Volume (l) | 25 | 25 |
| Flow rate (l/hr) | 8 | 8 |
| Residence time (hr) | 3.1 | 3.1 |
| Temp. (°C.) | 100 | 102 |
| Conversion (%) | 20 | 23 |
| Second reactor of perfect mixing type |  |  |
| Volume (l) | 15 | 15 |
| Flow rate (l/hr) | 4 | 4 |
| Residence time (hr) | 3.75 | 3.75 |
| Temp. (°C.) | 117 | 115 |
| Conversion (%) | 23 | 20 |
| In-line mixer |  |  |
| Volume (l) | 2 | 1.1 |
| Flow rate (l/hr) | 12 | 12 |
| Residence time (hr) | 0.17 | 0.09 |
| Temp. (°C.) | 110 | (*1) |
| Conversion (%) | 24 | 23 |
| First stage plug-flow |  |  |

TABLE 3-continued

|  | Example 2 | Example 3 |
|---|---|---|
| type reactor |  |  |
| Volume (l) | 25 | 25 |
| Flow rate (l/hr) | 12 | 12 |
| Residence time (hr) | 2.1 | 2.1 |
| Exit temp. (°C.) | 127 | 128 |
| Conversion (%) | 60 | 60 |
| Second stage plug-flow type reactor |  |  |
| Volume (l) | 25 | 25 |
| Flow rate (l/hr) | 12 | 12 |
| Residence time (hr) | 2.1 | 2.1 |
| Exit temp. (°C.) | 162 | 162 |
| Conversion (%) | 90 | 90 |
| Corresponding number of vessels of the plug-flow type reactor | 22 | 22 |

TABLE 4

|  | Example 2 | Example 3 |
|---|---|---|
| Rubber particle shape | ○ | ○ |
| $D_W$ (μm) | 1.04 | 1.00 |
| $D_W/D_N$ | 2.0 | 1.9 |
| Rubber particles having a density of not higher than 0.96 | Absent | Absent |
| Gloss (%) | 91 | 92 |
| Falling weight impact strength (kg · cm) | 68 | 64 |
| Izod impact strength (kg · cm/cm) | 11.0 | 10.2 |

In Table 3, the temperature identified with *1 indicates that no jacket was provided in this in-line mixer, and only the insulation was conducted.

EXAMPLE 4

The first and second reactors and their operation were the same as in Example 1.

The polymerization solutions continuously withdrawn from the exits of the first and second rectors, were immediately introduced into a third reactor of perfect mixing type having an internal capacity of 5 l and internally equipped with a double helical ribbon vane stirrer. In this third reactor, the temperature was 110° C., and the stirring vane was operated at a rotational speed of 100 rpm.

It was observed that by joining the polymerization solution from the first reactor in which the rubber was in a particulate form and the solution of a partially polymerized styrene from the second reactor containing no rubber, followed by mixing and stirring in the third reactor, rubber particles having large particle sizes disappeared, the rubber particle size became uniform, and the particle size distribution became narrow. The conversion by polymerization in the product at the exit of the third reactor was 26%.

The product discharged form the third reactor was introduced into a plug-flow type reactor of two stages (two reactors) connected in series, and polymerization was further continued.

This plug-flow type reactor was of the same type as used in Example 1.

In the first stage of the two stage plug-flow type reactor, the reaction temperature was 121° C. at the inlet and 128° C. at the exit, the rotational speed of the stirring vane was 10 rpm, and the conversion by polymerization was 65% at the exit. In the second stage reactor, the reaction temperature was 130° C. at the inlet and 160° C. at the exit, and the rotational speed of the stirring vane was 5 rpm. The conversion by polymerization was 90%. Further, from the inlet of the second stage reactor, a lubricant and a stabilizer such as 1.0 part of mineral oil and 0.05 part of triethylene glycol bis[3-(3-t-butyl-5-methyl-4-hydroxyphenyl)propionate] per 100 parts of the reaction mixture introduced into the second reactor, were added together with a small amount of styrene.

The polymerization solution withdrawn from the exit for the reaction mixture of the second stage plug-flow type reactor, was treated in the same manner as in Example 1 to obtain a rubber-modified styrene resin. The properties and performance of the rubber-modified styrene resin were evaluated in the same manner as in Example 1.

COMPARATIVE EXAMPLE 7

6.5 Parts of polybutadiene rubber (Asaprene 755A, manufactured by Asahi Chemical Co., Ltd.) was dissolved in 86 parts of styrene and 7.5 parts of ethylbenzene, and 0.0615 part (per 100 parts of the total amount of the polybutadiene, styrene and ethylbenzene) of tert-butyl peroxybenzoate was mixed thereto as a polymerization initiator. This feed solution was supplied at a rate of 12 l/hr to a reactor having a draft tube and internally equipped with a double helical vane stirrer, having an internal capacity of 40 l. In this reactor, the temperature was 102° C., and the rotational speed of the stirring vane was 100 rpm. The conversion by polymerization was 24% at the exit, and the rubber was in a particulate form. The polymerization solution withdrawn from the above identified first reactor was introduced directly to the two stage plug-flow type reactor without passing it through the small size reactor of perfect mixing type having a short residence time. The subsequent operation was conducted under the same conditions as in Example 4 to obtain a resin product.

COMPARATIVE EXAMPLE 8

The operation was conducted under the same conditions as in Example 4 except that the rotational speed of the stirring vane of the first reactor having an internal capacity of 25 l in Example 4 was changed to 90 rpm, and the polymerization solutions withdrawn from the first and second reactors were joined in a pipe and introduced directly into the two stage plug-flow type reactor without passing it through the third reactor of perfect mixing type having a short residence time, to obtain a resin product.

COMPARATIVE EXAMPLE 9

Instead of the first and second reactors having internal capacities of 25 l and 15 l in Example 4, a reactor having an internal capacity of 15 l was used as the first reactor, and a solution obtained by dissolving polybutadiene rubber in styrene and ethylbenzene, was charged in the first reactor, while a reactor having an internal capacity of 25 l was used as the second reactor and styrene was charged thereto, and polymerization was conducted respectively in the first and second reactors. The temperatures were 102° C. and 115° C., respectively, and the rotational speed of the stirring vane was 80 rpm in both reactors. The conversion by polymerization was 14% and 33%, respectively. In the first reactor, the rubber was not in a particulate form.

The subsequent operation was conducted under the same conditions as in Example 4 to obtain a resin product.

COMPARATIVE EXAMPLE 10

Instead of the first reactor having an internal capacity of 25 l in Example 4, a a reactor having a draft tube and internally equipped with a double helical vane stirrer, having an internal capacity of 40 l, was used as the first reactor. The temperature was 102° C., and the rotational speed of the stirring vane was 120 rpm. The conversion by polymerization was 37%, and the rubber was in a particulate form. Except for the above, the operation was conducted under the same conditions as in Example 4 to obtain a resin product, and the conversions by polymerization at the exits of the first and second stages of the plug-flow type reactor were 70% and 92%, respectively.

COMPARATIVE EXAMPLE 11

The same rubber solution as in Example 4 was supplied to the first reactor having an internal capacity of 15 l having a draft tube and internally equipped with a double helical vane at a rate of 4.8 l/hr. The temperature was 102° C., and the rotational speed of the stirring vane was 80 rpm. The conversion by polymerization was 23%, and the rubber was in a particulate form.

Separately, styrene was supplied to a second reactor having an internal capacity of 9 l and internally equipped with a double helical vane, at a rate of 2.4 l/hr. The temperature was 115° C., and the rotational speed of the stirring vane was 80 rpm.

The flows withdrawn from the above first and second reactors were joined and passed through a small size third reactor of perfect mixing type having a short residence time, and while discharging a part of the liquid out of the system by a pump, the liquid was introduced directly to the second stage plug-flow type reactor of Example 4 at a flow rate of 6 l/hr, without passing it through the first stage plug-flow type reactor. The temperature at the inlet was 120° C., and the temperature at the temperature at the exit was 164° C. The conversion by polymerization at the exit was 90%. Except for the above, the operation was conducted in the same manner as in Example 4 to obtain a resin product.

COMPARATIVE EXAMPLE 12

The same rubber solution as in Example 4 was supplied to a first reactor having a draft tube and internally equipped with a double helical vane, having an internal capacity of 40 l, at a rate of 12.8 l/hr. The temperature was 102° C., and the rotational speed of the stirring vane was 80 rpm. The conversion by polymerization was 23%, and the rubber was in a particulate form.

Separately, styrene was supplied to a second reactor having a draft tube and internally equipped with a double helical vane, having an internal capacity of 25 l, at a rate of 6.4 l/hr. The temperature was 115° C., and the rotational speed of the stirring vane was 80 rpm. The flows withdrawn from the first and second reactors were joined and passed through a small size third reactor having a short residence time. Then, while discharging a part of the liquid out of the system by means of a pump, the liquid was introduced to the two stage plug-flow type reactor at a rate of 16 l/hr. The subsequent operation was conducted under the same conditions as in Example 4 to obtain a resin product. The conversions by polymerization in the products at the exits of the first and second stages, were 52% and 82%, respectively.

The polymerization conditions of the foregoing Examples and Comparative Examples are shown in Table 5, and the results of the evaluation of the resin products thereby obtained are shown in Table 6.

and sent to the same small size third reactor as used in Example 4 having a residence time as short as 0.42 hour, and subjected to agitation with a rotational speed of the stirring vane of 90 rpm. Other conditions were the same as in Example 4.

TABLE 5

|  | Example 4 | Comparative Example 7 | Comparative Example 8 | Comparative Example 9 | Comparative Example 10 | Comparative Example 11 | Comparative Example 12 |
|---|---|---|---|---|---|---|---|
| First reactor of perfect mixing type |  |  |  |  |  |  |  |
| Volume (l) | 25 | 40 | 25 | 15 | 40 | 15 | 40 |
| Flow rate (l/hr) | 8 | 12 | 8 | 8 | 8 | 4.8 | 12.8 |
| Residence time (hr) | 3.1 | 3.3 | 3.1 | 1.9 | 5.0 | 3.1 | 3.1 |
| Temp. (°C.) | 102 | 102 | 102 | 102 | 102 | 102 | 102 |
| Conversion (%) | 23 | 24 | 23 | 14 | 37 | 23 | 23 |
| Second reactor of perfect mixing type |  | Nil |  |  |  |  |  |
| Volume (l) | 15 | — | 15 | 25 | 15 | 9 | 25 |
| Flow rate (l/hr) | 4 | — | 4 | 4 | 4 | 2.4 | 6.4 |
| Residence time (hr) | 3.75 | — | 3.75 | 6.25 | 3.75 | 3.75 | 3.9 |
| Temp. (°C.) | 115 | — | 115 | 115 | 115 | 115 | 115 |
| Conversion (%) | 20 | — | 20 | 33 | 20 | 20 | 20 |
| Third reactor |  | Nil | Nil |  |  |  |  |
| Volume (l) | 5 | — | — | 5 | 5 | 3 | 9 |
| Flow rate (l/hr) | 12 | — | — | 12 | 12 | 7.2 | 19.2 |
| Residence time (hr) | 0.42 | — | — | 0.42 | 0.42 | 0.42 | 0.47 |
| Temp. (°C.) | 110 | — | — | 110 | 110 | 110 | 110 |
| Conversion (%) | 26 | — | — | 25 | 35 | 26 | 26 |
| First stage plug-flow type reactor |  |  |  |  |  | Nil |  |
| Volume (l) | 25 | 25 | 25 | 25 | 25 | — | 25 |
| Flow rate (l/hr) | 12 | 12 | 12 | 12 | 12 | — | 16 |
| Residence time (hr) | 2.1 | 2.1 | 2.1 | 2.1 | 2.1 | — | 1.6 |
| Exit temp. (°C.) | 128 | 128 | 128 | 128 | 128 | — | 128 |
| Conversion (%) | 65 | 65 | 65 | 65 | 70 | — | 56 |
| Second stage plug-flow type reactor |  |  |  |  |  |  |  |
| Volume (l) | 25 | 25 | 25 | 25 | 25 | 25 | 25 |
| Flow rate (l/hr) | 12 | 12 | 12 | 12 | 12 | 6 | 16 |
| Residence time (hr) | 2.1 | 2.1 | 2.1 | 2.1 | 2.1 | 4.2 | 1.6 |
| Exit temp. (°C.) | 160 | 160 | 160 | 160 | 160 | 162 | 160 |
| Conversion (%) | 90 | 90 | 90 | 90 | 92 | 90 | 82 |
| Corresponding number of vessels of the plug-flow type reactor | 22 | 22 | 22 | 22 | 22 | 11 | 22 |

TABLE 6

|  | Example 4 | Comparative Example 7 | Comparative Example 8 | Comparative Example 9 | Comparative Example 10 | Comparative Example 11 | Comparative Example 12 |
|---|---|---|---|---|---|---|---|
| Rubber particle shape | ○ | x | △ | ○ | △ | ○ | ○ |
| $D_W$ (μm) | 1.02 | 0.99 | 1.02 | 1.05 | 0.98 | 1.04 | 1.03 |
| $D_W/D_N$ | 2.0 | 3.2 | 2.7 | 2.0 | 2.5 | 2.1 | 2.2 |
| Rubber particles having a density of not higher than 0.96 | Absent | Present | Present | Absent | Present | Present | Present |
| Gloss (%) | 90 | 78 | 81 | 92 | 84 | 85 | 84 |
| Falling weight impact strength (kg · cm) | 82 | 18 | 16 | 24 | 35 | 37 | 20 |
| Izod impact strength (kg · cm/cm) | 10.8 | 10.6 | 11.1 | 11.0 | 9.8 | 10.5 | 11.2 |

EXAMPLE 5

The operation was conducted under the same conditions as in Example 4 except for the following points.

Namely, the temperature of the first reactor was 100° C. The conversion by polymerization in the reaction product at the exit of the first reactor was 20%, and the rubber was in a particulate form. Further, the temperature in the second reactor was 117° C., and the conversion by polymerization in the product at the exit of this reactor was 23%. The polymerization solutions withdrawn from the first and second reactors were joined

EXAMPLE 6

The operation was conducted under the same conditions as in Example 4 except for the following points. Firstly, the polymerization initiator mixed to the rubber solution to be supplied to the first reactor was changed to 0.056 part of tert-butyl peroxyacetate (product with a purity of 50%), and the temperature in the first reactor was 100° C. The conversion by polymerization in the reaction product at the exit of the first reactor was 23%, and the rubber was in a particulate form.

The temperature in the second reactor was 115° C., and the conversion by polymerization in the product at the exit of the second reactor was 20%.

The polymerization solutions withdrawn from the first and second reactors were joined and sent to the small size third reactor having a short residence time, and stirred at a rotational speed of the stirring vane of 90 rpm.

In the subsequent first stage reactor of the two stage plug-flow type reactor, the inlet temperature was 120° C., the exit temperature was 130° C., and the conversion by polymerization was 64% at the exit. In the second stage reactor, the inlet temperature was 133° C., the outlet temperature was 170° C., and the conversion by polymerization was 89% at the exit of the reactor. Other conditions were the same as in Example 4.

The operational conditions of Examples 5 and 6 are shown in Table 7, and the results of evaluation of the products thereby obtained are shown in Table 8.

TABLE 7

|  | Example 5 | Example 6 |
|---|---|---|
| First reactor of perfect mixing type |  |  |
| Volume (l) | 25 | 25 |
| Flow rate (l/hr) | 8 | 8 |
| Residence time (hr) | 3.1 | 3.1 |
| Temp. (°C.) | 100 | 100 |
| Conversion (%) | 20 | 23 |
| Second reactor of perfect mixing type |  |  |
| Volume (l) | 15 | 15 |
| Flow rate (l/hr) | 4 | 4 |
| Residence time (hr) | 3.75 | 3.75 |
| Temp. (°C.) | 117 | 115 |
| Conversion (%) | 23 | 20 |
| Third reactor |  |  |
| Volume (l) | 5 | 5 |
| Flow rate (l/hr) | 12 | 12 |
| Residence time (hr) | 0.42 | 0.42 |
| Temp. (°C.) | 110 | 110 |
| Conversion (%) | 25 | 26 |
| First stage plug-flow type reactor |  |  |
| Volume (l) | 25 | 25 |
| Flow rate (l/hr) | 12 | 12 |
| Residence time (hr) | 2.1 | 2.1 |
| Exit temp. (°C.) | 128 | 130 |
| Conversion (%) | 65 | 64 |
| Second stage plug-flow type reactor |  |  |
| Volume (l) | 25 | 25 |
| Flow rate (l/hr) | 12 | 12 |
| Residence time (hr) | 2.1 | 2.1 |
| Exit temp. (°C.) | 160 | 170 |
| Conversion (%) | 90 | 89 |
| Corresponding number of vessels of the plug-flow type reactor | 22 | 22 |

TABLE 8

|  | Example 5 | Example 6 |
|---|---|---|
| Rubber particle shape | ○ | ○ |
| $D_W$ (μm) | 1.04 | 1.02 |
| $D_W/D_N$ | 2.1 | 2.0 |
| Rubber particles having a density of not higher than 0.96 | Absent | Absent |
| Gloss (%) | 89 | 91 |
| Falling weight impact strength (kg · cm) | 77 | 71 |
| Izod impact strength (kg · cm/cm) | 11.0 | 10.5 |

Heretofore, rubber-modified styrene resins produced by conventional continuous methods were inferior in the quality, particularly in the mechanical strength such as impact strength, or in the appearance such as the gloss, as compared with those prepared by conventional batch methods. Whereas, according to the present invention, it is possible to obtain by a continuous process a rubber-modified styrene resin having a quality equal to or superior to the products obtained by the batch methods.

We claim:

1. A process for continuously producing a rubber-modified styrene resin containing substantially no rubber polymer having a density of not higher than 0.96 gm/cm$^3$ at 25° C., which comprises continuously supplying a feed solution composed of 80 to 97% by weight of a styrene monomer and 3 to 20% by weight of a rubber polymer to a first perfect mixing reactor and subjecting it to a polymerization, while continuously supplying a feed composed mainly of a styrene monomer to a second reactor useful for a polymerization reaction and subjecting it to a polymerization reaction, introducing the products continuously withdrawn from the first and second reactors, respectively, into a mixer and mixing them, introducing the product continuously withdrawn from the mixer into a plug-flow reactor to increase the conversion by polymerization, and then devolatilizing unreacted monomers from the reaction product, wherein the rubber polymer in the product withdrawn from the mixer is already in a particulate form, but up to the exit of the mixer, the polymerization proceeds only to such an extent that the conversion by polymerization of monomers to polymer does not exceed 30% as measured at the exit of the mixer, said plug-flow reactor consisting of a single reactor or a plurality of reactors connected in series and having a plug-flow characteristic corresponding to at least 15 vessels in a model series of perfect mixing vessels, and in this plug-flow reactor, the polymerization proceeds to conversion to polymer within a range of from 85-95%, with the provisos that:
   (a) the first perfect mixing reactor permits the feed solution to be maintained in a substantially uniform mixed state in the reactor,
   (b) the residence time in the mixer is adjusted to be shorter than the residence time of the reaction solution in the first reactor,
   (c) the ratio of the flows from the two reactors is within a range of from 3:1 to 1:3, and
   (d) the polymerization solutions from the first and second reactors are thoroughly mixed in the mixer, whereby uniform rubber particles will finally be formed under a stabilized condition.

2. The process according to claim 1, wherein the mixer is an in-line mixer equipped with a stirrer.

3. The process according to claim 1, wherein the mixer is a third complete mixing reactor having a residence time shorter than that of the first reactor.

4. The process according to claim 1, wherein in the first perfect mixing reactor, the polymerization is conducted until the rubber polymer is formed into a particulate form.

5. The process according to claim 1, wherein the styrene monomer constituting the feed for each of the first and second reactors is selected from the group consisting of unsubstituted styrene, alkyl-substituted styrenes, halogen-substituted styrenes and mixtures thereof.

6. The process according to claim 1, wherein the styrene monomer constituting the feed for each of the first and second reactors is partially substituted by other ethylenically unsaturated monomer copolymerizable therewith.

7. The process according to claim 1, wherein the rubber polymer in the feed solution for the first reactor is selected from the group consisting of natural rubber, styrene-butadiene rubber, polybutadiene, polyisoprene, nitrile rubber, and an elastomeric block copolymer of a 1,3-conjugated diene with a styrene monomer.

* * * * *

UNITED STATES PATENT AND TRADEMARK OFFICE
CERTIFICATE OF CORRECTION

PATENT NO. : 5,194,491
DATED : March 16, 1993
INVENTOR(S) : Takaaki SAKITA, et al.

It is certified that error appears in the above-indentified patent and that said Letters Patent is hereby corrected as shown below:

On the title page, Item [73], the Assignee should read as follows:

--Mitsubishi Kasei Polytec Company, Tokyo, Japan--

Signed and Sealed this

Thirty-first Day of May, 1994

BRUCE LEHMAN

Attest:

Attesting Officer

Commissioner of Patents and Trademarks